2,935,982
COOKING UTENSIL SUPPORT

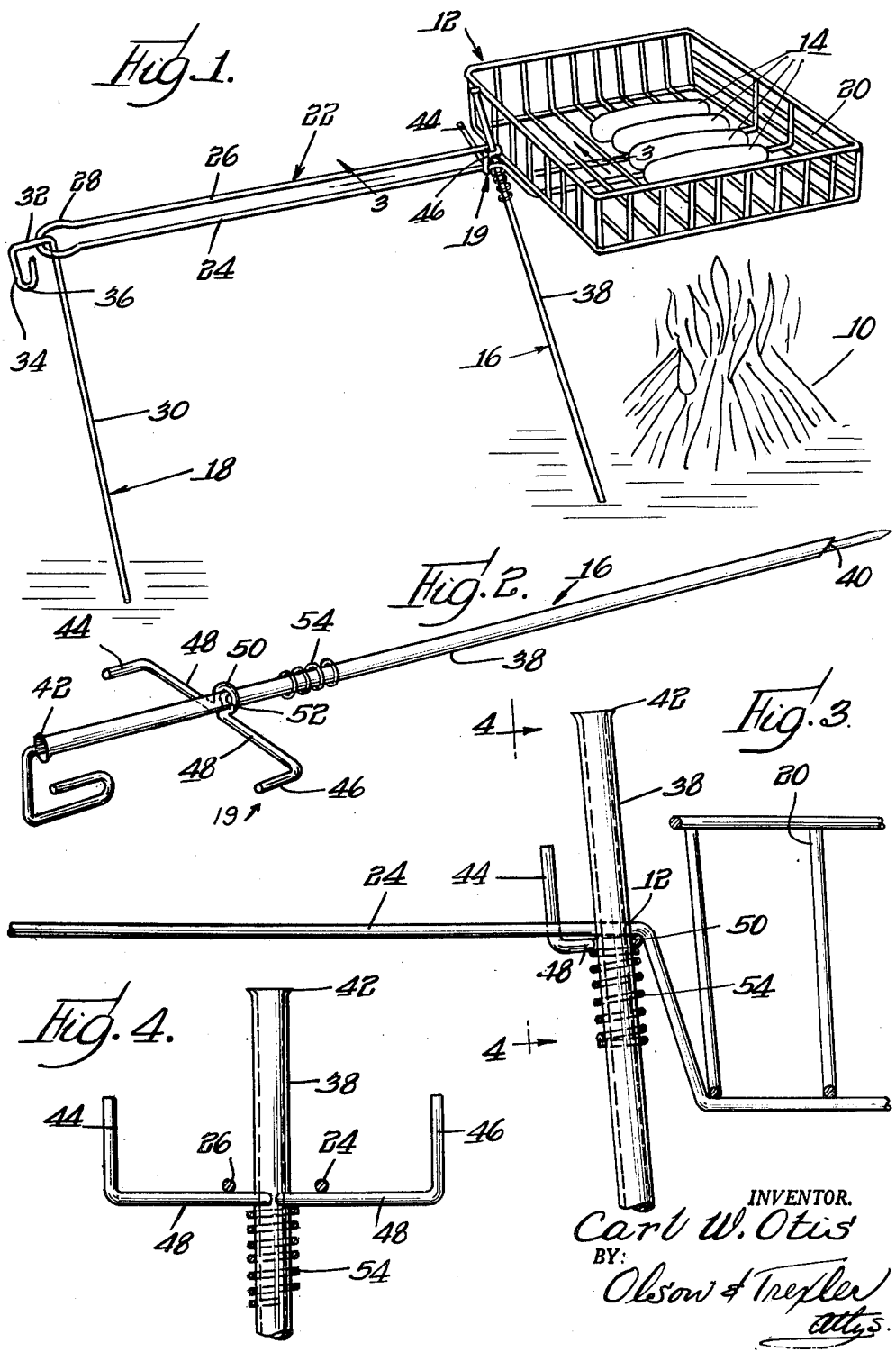

Carl W. Otis, Wilmette, Ill.

Application April 27, 1955, Serial No. 504,157

2 Claims. (Cl. 126—30)

This invention relates to a cooking utensil support, and more particularly to a device for supporting cooking utensils over a heat source without requiring an operator to hold the utensil.

Any person familiar with outdoor cooking is aware of the fact that it is uncomfortable, if not impossible at times, to hold a cooking utensil over a wood burning fire. This is particularly true if the cooking utensil has a short handle. The heat from a wood burning fire is intense and prevents the operator from remaining in near proximity thereto. Additionally, if the cooking utensils are made of metal, with metal handles integral therewith or connected thereto, heat is rapidly conducted from the fire to the hand of the operator making it uncomfortable to hold the utensil.

There is also the factor that outdoor fires, such for example as those made on picnics or camping trips, are not suitable for resting cooking utensils thereon. The utensil tips as the wood or other fuel burns down thereby spilling the contents of the utensil or bringing the food into contact with the open fire. In view of the fact that it is undesirable to rest the cooking utensil on the fire, it is generally held by the hand of the cook under the adverse circumstances indicated above.

The invention herein contemplates the provision of a support for a cooking utensil obviating the difficulties and disadvantages enumerated above.

It is an object of the present invention to provide a cooking utensil support for use over an outdoor fire.

It is a further object of the invention herein to provide a cooking utensil support that is inexpensive to manufacture.

It is yet another object to provide a cooking utensil support that is adjustable in height.

It is still another object to provide a cooking utensil support that is light in weight and may be conveniently assembled and disassembled.

It is yet another object of the invention herein to provide a cooking utensil that occupies a very small storage space and has interfitting parts contributing to the reduced size and space occupied by the device when stored.

These and other objects and advantages of the device will be more apparent from the detailed description and drawings to follow, wherein:

Fig. 1 is a perspective view of the invention herein as used with a cooking utensil over an open outdoor fire;

Fig. 2 is a perspective view of the invention as it is assembled for storage;

Fig. 3 is an enlarged sectional view taken along the line 3—3 of Fig. 1; and

Fig. 4 is a fragmentary elevational view taken along the line 4—4 of Fig. 3.

Referring now more particularly to the drawings, there is shown in Fig. 1 a wood fire 10, and cooking utensil 12 with frankfurters 14 therein. The utensil 12 is supported by a device comprising the invention herein including two vertical support members 16 and 18 and a horizontal support member 19. The object, of course, is to properly support the cooking utensil 12 over the fire 10 in order to cook the frankfurters 14.

The cooking utensil 12 is of ordinary design and includes a wire basket or framework 20 for supporting the food to be cooked, and a looped wire handle member 22. It will be seen that the wire handle member includes two parallel wire members 24 and 26 joined by an integral looped over end portion 28. The utensil here shown is for illustrative purposes only and it is to be understood that the utensil holder may be used with utensils of varying shape, size and structure.

As seen in Fig. 1, the vertical support member 18 is made of a single length of heavy, rigid wire and includes an elongated portion 30, suitably pointed at one end thereof for insertion into the ground. At the other end of elongated portion 30 is a transversely bent portion 32, and a downwardly bent portion 34, with the wire terminating in a hook portion 36. The function of the bent over portions will be discussed hereinafter in connection with the operation of the device.

The other vertical support member 16, seen in Fig. 2, comprises an elongated tubular portion 38 pointed or bevelled at one end as at 40, and flanged or flared outwardly at the other end as indicated at 42. The purpose of the point 40 is to facilitate forcing the tubular member into the ground. The flanged out portion 42 facilitates placement of the wire member 18 within the tubular portion 16 when the device is stored.

The horizontal support member 19 is made of a single piece of steel wire and is U-shaped in configuration including arms 44 and 46 joined by a web or bight portion 48. In the center of the web portion 48 the wire is bent to form an annular loop 50 therein, the inner diameter 52 of said loop being slightly greater than the outer diameter of the elongated tubular portion 38. It is, therefore, apparent that the horizontal support member 19 may be slidably moved up and down the elongated portion 38 of the vertical member 16.

Because the horizontal support member is otherwise more or less free to move up and down on the vertical support member 16, the coil spring 54 is provided to maintain the horizontal support member in any desired position on the vertical member. The coil spring frictionally engages the outer surface of the tubular member 38. The coil spring does not carry the weight of the cooking utensil, as will be discussed in connection with the operation of the device, but merely supports the horizontal member in any desired position before or after the cooking utensil is placed thereon.

Discussing now the operation of the cooking utensil holder herein, the vertical member 16 is first inserted in the ground adjacent the fire 10. Following this the length of the handle of the cooking utensil is considered, and the vertical support member 18 is appropriately placed outward from the support member 16 relative to the fire 10 in a position corresponding approximately to the end of the handle of the cooking utensil. The horizontal support member 19 is then moved vertically on the support member 16 until a desired vertical position is obtained above the fire 10. The proper position, of course, will depend on the food being cooked and the position of the cooking utensil necessary to effect proper cooking. After the desired position is obtained for the horizontal support member 19, the coil spring 54 is positioned under the support member and holds it in the desired position.

The wires 24 and 26 of the handle 22 of the cooking utensil are then moved over the top of the vertical support member 16, and the utensil is lowered until these arms engage the web 48 of the horizontal support member. The looped end 28 of the handle 22 is then moved over the bent portion 32 of the elongated member 30. The weight of the cooking utensil, and the food therein, causes the annular loop 50 of the horizontal member to tip and thereby wedgingly to engage the surface of the elongated tubular portion 38. More particularly, the diameter of the aperture 52 is effectively reduced, thereby causing the horizontal support member to be held firmly against the sides of the vertical support member 16.

Whereas the weight of the cooking utensil and food will tend to cause the utensil to tip towards the fire 10, this force is offset by the transversely bent portion 32 on the vertical support member 18. The downwardly bent portion 34 of member 18 prevents the looped over portion 28 of the handle 22 from sliding off of the transversely bent portion 32. It will be further noted that the arms 46 and 44 of the horizontal member 19 prevent the handle from moving out of engagement with the horizontal member.

Although the utensil support has been described in connection with a cooking utensil as shown herein, it is to be understood that its use is not restricted to utensils of the type described. The device may be used with a wide variation of cooking utensils.

After the food has been cooked and it is desired to store the utensil holder, the vertical members 16 and 18 are removed from the ground after which the wire support member 18 is placed within the tubular support member 16. It will be seen that when the device is thus assembled, the parts are loosely held together as a unitary device which may be conveniently stored. The flanged out portion 42 is of a greater diameter than the aperture 52 and therefore prevents movement of the horizontal member off of one end of the vertical support member 16. The coil spring 54 prevents the horizontal member from sliding off the other end of elongated portion 38.

It is apparent from the foregoing that the invention herein is inexpensive to manufacture and is simple in operation. It may be conveniently used for all sizes of cooking utensils and is readily assembled and disassembled.

The specific example of the invention herein shown and described will be understood as being for illustrative purposes only. Various changes in structure will doubtless occur to those skilled in the art and are to be understood as forming a part of this invention in so far as they fall within the spirit and scope of the appended claims.

The invention is hereby claimed as follows:

1. A cooking combination for use on the ground comprising a cooking utensil having an enlarged body portion and an elongated handle portion, support means for supporting said body portion above the ground, said means comprising an elongated tubular member having one end pointed to be inserted in the ground, the other end being flared, a rigid U-shaped support member carried by said tubular member and longitudinally adjustable thereon having upwardly projecting legs and a horizontally disposed bight member including an annular member of slightly greater diameter than said tubular member but of lesser diameter than the flared end thereof and adapted to encircle more than one half but less than the entire circumference of said tubular member in such a manner that when tipped said annular member will engage said tubular member wedgingly to lock said support in a fixed position on said tubular member, positioning means carried by said tubular member and longitudinally adjustable thereon to position axially said support member on said tubular member, said positioning means and said support member being independently movable of each other, said support member supporting said cooking utensil handle portion upon said support adjacently said body portion, and handle holding means engageable with said handle portion to limit tipping of said cooking utensil under the influence of the weight of food carried in said body portion.

2. A cooking combination according to claim 1 wherein said handle holding means comprises an elongated wire member having a diameter smaller than the inside diameter of said tubular member and adapted to have one end inserted in the ground, the other end being curved to engage the said cooking utensil handle, said wire member being insertable into said tubular member for storage.

References Cited in the file of this patent

UNITED STATES PATENTS

| | | |
|---|---|---|
| 1,061,431 | West | May 13, 1913 |
| 1,091,877 | Collis | Mar. 31, 1914 |
| 1,166,151 | Penn | Dec. 28, 1915 |
| 1,472,668 | Oliver | Oct. 30, 1923 |
| 1,507,733 | Harding | Sept. 9, 1924 |
| 2,522,223 | Hardin et al. | Sept. 12, 1950 |
| 2,538,440 | Bell | Jan. 16, 1951 |
| 2,545,005 | Russell | Mar. 13, 1951 |
| 2,619,951 | Kahn | Dec. 2, 1952 |
| 2,621,007 | Barbin | Dec. 9, 1952 |
| 2,631,216 | Ames | Mar. 10, 1953 |
| 2,637,313 | White | May 5, 1953 |
| 2,698,726 | Howe | Jan. 4, 1955 |